United States Patent Office 3,173,219
Patented Mar. 16, 1965

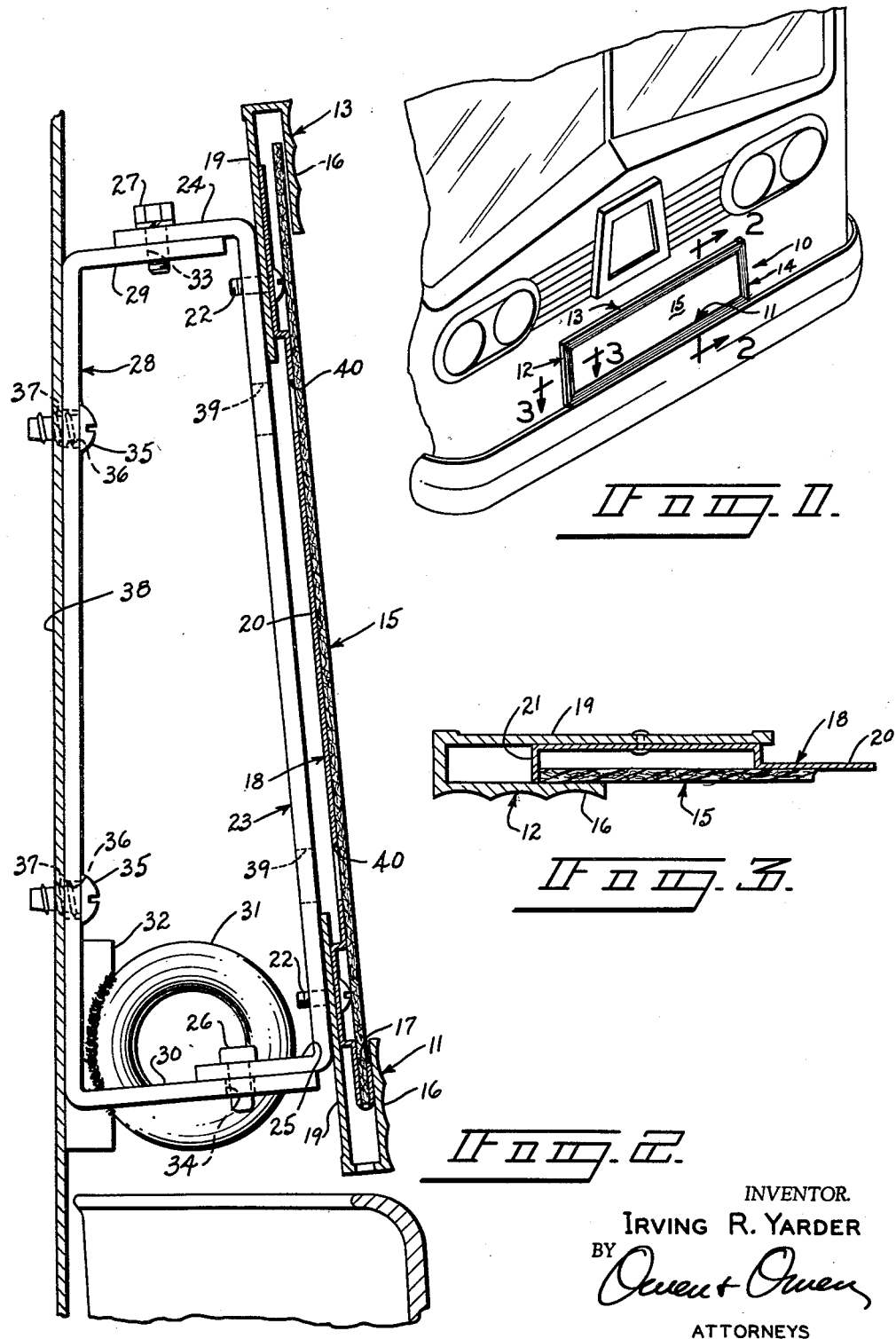

3,173,219
DEMOUNTABLE FRAME FOR AN
ADVERTISING SIGN
Irving R. Yarder, Toledo, Ohio, assignor to The Yarder Manufacturing Co., Toledo, Ohio, a corporation of Ohio
Filed Aug. 9, 1962, Ser. No. 215,816
2 Claims. (Cl. 40—129)

This invention relates to demountable frames for advertising signs and particularly to a demountable frame adapted for use on a public traction vehicle, such as a motor bus, for the display of advertising signs which are readily replaceable in the sign frame, the frame, in itself, also being readily mountable and demountable from the bus.

The utilization of the space on the sides, front and rear of public traction vehicles such as passenger buses is becoming more widespread because such space is displayed to many thousands of people in the cities where buses operate and the advertising message is readily called to the attention not only of bus riders but also of passers-by and motorists. Many frames for mounting on buses have been devised which are readily adaptable for use on the sides and rear of a bus but the sign frames which have been designed in the past for use on the front of buses have been limited by reason of the necessity for maintenace of ready access to the towing eyes which are mounted on the front of the bus and which usually are connected directly to its principal chassis members. In order to leave the towing eyes accessible, the size of the advertising frames has been limited.

In addition, some difficulty has been encountered in mounting and dismounting advertising frames of this type when the frames are rigidly mounted on the bus elements, either the structural members or the metallic skin, and difficulties have also been encountered in centering and properly positioning the signs at the time of their initial mounting.

It is the principal object of the instant invention to provide a demountable frame for an advertising sign which is particularly designed and adapted to be readily mounted on and removed from the front end of a traction vehicle and includes within its design features which avoid obstructing quick and easy access to the towing eyes on such a vehicle.

It is a further object of the instant invention to provide a demountable frame for an advertising sign wherein the entire sign frame readily may be demounted from the bus without removing the structural elements by which the sign is mounted on the bus. This facilitates, of course, access to the bus skin and to the towing eyes without necessitating the removal of the mounting means from the bus itself.

It is yet another object of the instant invention to provide a frame intended to mount advertising signs on the front of a public conveyance and comprising a sign frame and separable mounting and support brackets for the frame, the brackets being designed to removably support a sign frame of any width up to the maximum width of the vehicle and being readily separable to provide easy access to the underlying parts of the vehicle.

Other and more specific objects and advantages of a demountable frame for an advertising sign embodying the invention will be better understood from the specification which follows and from the drawings in which:

FIG. 1 is a fragmentary view in perspective of the front of a traction bus on which a sign frame embodying the invention is shown in mounted position;

FIG. 2 is a fragmentary, vertical sectional view, taken along the line 2—2 of FIG. 1 and shown on a greatly enlarged scale; and FIG. 3 is a fragmentary, horizontal sectional view, taken along the line 3—3 of FIG. 1 and shown on a still further enlarged scale.

A demountable frame for an advertising sign embodying the invention is generally indicated by the reference number 10 and is illustrated as being rectangular in shape, for example, some ten or twelve inches high and three or four feet long. The frame 10 comprises four extruded channel members, 11, across the bottom, 12, extending up one side (the left in FIG. 1), 13 extending across the top of the frame and 14 forming the other (right) end 10. One of the side channels 12 or 14, in this case the channel 14, is removable in order to provide for the insertion and removal of advertising display cards, such as the card 15, upon which the advertising message is displayed. For example, the side frame 14 may be designed according to the teachings of Patent No. 3,016,642 issued January 16, 1962, and provided with a suitable positioning pin and/or captive screw for ready removable from the frame 10.

In order that the sign may present a neat and uniform appearance and in order to retain the edges of the display card 15 in place, each of the channels 11, 12, 13 and 14 has an inwardly directed, fluted border 16 which overlaps the edge of the display card 15 to provide a "frame" around the message carried by the display card 15. The display card 15, however, is actually supported in position in the demountable frame 10 by means of an auxiliary channel 17 (FIG. 2) formed along the bottom, turned-up edge of a sheet metal backing panel 18 which is riveted or otherwise securely connected to back flanges 19 of the channels 11–13. The backing panel 18 has a center portion 20 which is displaced forwardly from the plane of the edges of the backing panel 18, a distance such that it presses snugly against the center part of the display card 15 when the display card 15 is engaged in the support channel 17 and in back of the borders 16 of the frame 10. The center portion 20 backs up the card 15 to prevent its being collapsed inwardly and damps any tendency of the card 15 to flutter. Along the side of the frame 10 where the permanent side channel 12 extends (FIG. 3) the backing panel 18 has a turned over lip 21 which extends forwardly into contact with the rear surface of the channel 12, forming a stop for the edge of the card 15. Thus, the backing panel 18 provides the main structural element by which the channel members 11–13 are held in assembled and spaced relationship in order to integrate the entire demountable frame 10 itself.

An integral display card unit comprising the backing panel 18, the display card 15, and frame channel members 11–13 is connected, for example, by machine screws 22 to a pair of vertically extending mounting brackets 23, each of which has two rearwardly extending parallel arms 24 and 25. The lower arm 25 carries a pilot pin 26 and the upper arm 24 a screw 27. In the event of an exceedingly long sign, of course, more than two brackets 23 might be employed.

Each of the brackets 23 is removably mountable upon a support bracket 28 having two forwardly directed arms, an upper arm 29 and a lower arm 30. The two arms 29 and 30 extend generally parallel to each other but, preferably, are inclined upwardly slightly and the lower arm 30 preferably is longer than the upper arm 29 in order to incline the plane of the display card unit including the display card 15 from the vertical, tilting the unit to facilitate reading the advertising message by passers-by and motorists. The arms 29 and 30 space the display card unit, comprising the backing panel 18, the display card 15, and frame channel members 11–13, a distance in excess of a predetermined distance. The predetermined distance is the distance between the vertical skin of the vehicle body and the outermost protrusion of a pair of heavy towing eyes 31 which are conventionally mounted on the front end of traction busses and rigidly connected, for example, by heavy welding, to a main frame element 32 of the traction bus. The upper arms 29 have tapped holes 33 for the assembly screws 27 and the lower arms 30 have holes 34 for the pilot pins 26.

Each of the support brackets 28 is mounted, usually considered permanently, by a pair of heavy thread cutting screws 35 which extend through suitable holes 36 in the brackets 28 and are threaded into holes 37 that are drilled in a portion of the metallic skin 38 of the traction bus.

In order to facilitate the initial mounting of the demountable frame 10 including its support bracket 28 on the front of a traction bus, the front brackets 23 and the backing panel 18 all have large diameter aligned holes 39 and 40 which are also aligned with the holes 36 in the support brackets 28. A workman first assembles the entire structure including the display card unit, bracket 23, and support bracket 28 and swings the brackets 23 and 28 into alignment as illustrated in FIG. 2. He then places the entire structure on the front of the traction bus with the backs of the support brackets 28 against the skin 38 and centers the demountable frame 10 on the front of the bus. He may then insert a scribing tool through the holes 40 and 39 in the bracket 23 and backing panel 18 and scribe the locations at which the holes 37 are to be drilled through the skin 38. He then sets the sign and its support brackets 23 aside, drills the holes 37 for the reception of the screws 35 and, again holding the sign and its brackets against the front of the skin, inserts the metal cutting screws 35 through the holes 40 and 39 and drives them tightly into holes 36 in the skin 38.

The integral display card unit, comprising the backing panel 18, the display card 15, and frame channel members 11–13, itself may readily be demounted from its support brackets by merely unscrewing the screws 27 from the upper arms 29 and pulling the pilot pins 26 upwardly out of the holes 34 in the lower arms 30.

When it becomes necessary, for example, to quickly gain access to the towing eyes 31, the display card unit can readily be removed and replaced without removing the display card 15.

While the foregoing detailed description is specifically related to the particular embodiment disclosed, it will be appreciated that the relative lengths of the arms 29 and 30 of the bracket 28 and their angularity are not critical so that if the skin of the vehicle tilts forwardly or backwardly, the lengths of the arms may be changed to result in the sign card 15 lying either in a vertical plane or tilted backwardly therefrom, as desired.

Similarly, while a particular mounting method is made possible by the embodiment of the invention described, it will be appreciated, of course, that the positioning of the holes 37 in the skin 38 may be made by template or other measurement.

Having described my invention, I claim:

1. A demountable frame for an advertising sign to be mounted on a vertical surface comprising, a rectangular border frame consisting of channel members and at least one side of which is separable therefrom, a backing panel extending across the space between the members of said border frame and secured to said border frame, said border frame and said backing panel forming an integral display card unit, a display card support channel interiorly of the lower one of said channel members, said backing panel having a central portion displaced from the plane of the edges thereof and protruding into the space between the members of said border frame for frictional engagement of the back surface of a display card supported in said channel with its edges in said channel members, support members mounted on such vertical surface, each of said support members consisting of a vertically extending bracket having forwardly extending, generally parallel arms at its ends, mounting members secured on the back side of said display card unit, each of said mounting members consisting of a vertically extending bracket having rearwardly extending, generally parallel arms at its ends, the arms of said brackets being equally spaced and engageable as an upper pair and a lower pair and disengageable means comprising a pilot pin and hole on one engageable pair of said arms and threaded means on the other pair of said arms for releasably securing said members together and for supporting said display card unit outwardly of such vertical surface.

2. A demountable frame according to claim 1 for use on the front end of a traction bus having a vertical skin and a pair of forwardly extending towing eyes protruding therefrom, such skin and the outermost protrusion of such towing eyes defining a predetermined distance, and in which the lower pair of arms of the brackets extend forwardly a distance greater than such predetermined distance, whereby the display card unit overlies and extends in front of such towing eyes.

References Cited by the Examiner

UNITED STATES PATENTS

| | | | |
|---|---|---|---|
| 1,111,635 | 9/14 | Austin | 40—62 |
| 1,776,618 | 9/30 | Chadwick | 40—209 |
| 1,829,824 | 11/31 | Forrester | 40—209 |
| 1,879,906 | 9/32 | Linstrom | 40—209 X |
| 2,269,675 | 1/42 | Livingston | 40—129 X |
| 2,836,913 | 6/58 | Thomson | 40—129 |
| 2,895,246 | 7/59 | Menges | 248—205 X |
| 2,921,395 | 1/60 | Fishman | 40—209 |
| 3,016,642 | 1/62 | Kowalski | 40—152 |

CHARLES A. WILLMUTH, Primary Examiner.

JEROME SCHNALL, Examiner.